United States Patent [19]

Lee et al.

[11] Patent Number: 5,157,084
[45] Date of Patent: Oct. 20, 1992

[54] PROCESS OF MAKING HOLLOW POLYMER LATEX PARTICLES

[75] Inventors: Do I. Lee, Midland; Michael R. Mulders, Essexville; Dwayne J. Nicholson, Sanford; Arthur N. Leadbetter, Midland, all of Mich.

[73] Assignee: The Dow Chemical Company, Midland, Mich.

[21] Appl. No.: 597,263

[22] Filed: Oct. 12, 1990

[51] Int. Cl.$^5$ .............................. C08F 265/02
[52] U.S. Cl. .................... 525/301; 525/902; 523/201; 524/460
[58] Field of Search ............... 525/301, 902; 523/201; 524/460

[56] References Cited

U.S. PATENT DOCUMENTS

| | | | |
|---|---|---|---|
| 3,426,101 | 2/1969 | Ryan et al. | 525/902 |
| 4,427,836 | 1/1984 | Kowalski | 525/301 |
| 4,468,498 | 8/1984 | Kowalski | 525/301 |
| 4,469,825 | 9/1984 | Kowalski | 523/201 |
| 4,594,363 | 6/1986 | Blankenship | 523/201 |
| 4,880,842 | 11/1989 | Kowalski | 525/301 |

FOREIGN PATENT DOCUMENTS 0335029 10/1989 European Pat. Off. .

OTHER PUBLICATIONS

*Journal of Applied Polymer Science*, vol. 10, pp. 713–729, "Some Physicochemical Properties of Poly(ethyl Acrylate) Emulsions Containing Carboxyl Groups", 1966.
*Journal of Applied Polymer Science*, vol. 14, pp. 897–909, "Mechanism of Alkali Thickening of Acid-Containing of Emulsion Polymers. I. Examination of Latexes by Means of Viscosity", 1970.
*Journal of Applied Polymer Science*, vol. 14, pp. 911–923, "Mechanism of Alkali-Thickening of Acid-Containing Emulsion Polymers. II. Examination of Latexes with the Light Microscope", 1970.
*Journal of Applied Polymer Science*, vol. 11, pp. 1963–1978, "Alkali Solubility of Carboxylated Polymer Emulsions", 1967.

*Primary Examiner*—Maurice J. Welsh
*Assistant Examiner*—Rachel Johnson

[57] ABSTRACT

This invention relates to a process of making hollow polymer latex particles without the use of acid in the swellable polymer core; the latexes are useful as opacifying plastic pigments for various coatings and particularly as gloss-enhancing plastic pigments for paper and paperboard coatings. Known methods for preparing hollow latexes require cores containing acid or acidic monomers to enable swelling to core at room temperature. The existence of acid in the polymer disadvantageously increases the polymer's affinity to water. Applicants have discovered that non-carboxylated latexes having a variety of $T_g$'s will also swell at higher temperatures. The mechanism entails the use of acrylate and methacrylate ester monomers which are hydrolyzable and swellable at higher temperatures in alkaline environments. Such mechanisms for making swollen latexes provide for a wide variety of potential end-uses as well as a wide variety of potential latexes.

7 Claims, No Drawings

PROCESS OF MAKING HOLLOW POLYMER LATEX PARTICLES

BACKGROUND OF THE INVENTION

This invention relates to a process of making hollow polymer latex particles which are useful as opacifying plastic pigments for various coatings and particularly as gloss-enhancing plastic pigments for paper and paperboard coatings.

Hollow particles are known to be useful as opacifying agents in coating applications such as in paint or paper coating. They also improve paper coating gloss. The use of the hollow latex in such coatings reduces the need for expensive pigments, such as $TiO_2$, without adding excessive and undesirable weight to the coating. The hollow latex particle provides opacity because the hollow structure in a latex particle scatters light more efficiently than a corresponding particle of uniform density. The light scattering properties are related to the difference in refractive index between the shell and the internal void. Such hollow latexes have additional utility in areas other than coatings such as in processes involving microencapsulations to prepare for example, control release agents.

U.S. Pat. No. 4,427,836 and U.S. Pat. No. 4,594,363 disclose two different processes for making hollow latexes by swelling core-shell polymer particles having acid-containing cores with a volatile base or a permanent base. U.S. Pat. No. 4,880,842 describes several disadvantages of having high levels of copolymerized acid in the core polymer and discloses a process for making hollow latexes by introducing a non-polymeric acid to an early stage of the multi-stage polymer particles instead of copolymerizing acid to make swellable cores.

These known methods for preparing hollow latexes require cores containing acid or acidic monomers to enable swelling to occur at room temperature. The existence of acid in the polymer disadvantageously increases the polymer's affinity to water. The sensitivity to the effects of water undesirably renders the coating into which the latex is formulated sensitive to moisture as well; an undesirable property in coating applications. An acidic core is also thought to impart polarity to the polymer and because of such polarity the polymer is thought to not adsorb surfactants well rendering the polymer unstable or prone to coagulation or aggregation in larger particles. The water sensitivity of the core or high affinity for water by the core is thought to make it difficult to encapsulate the core with the shell polymer because the core tends to remain at the polymer-water interface on the surface of the particle rather than be encapsulated by the shell.

These known processes for preparing hollow polymer particles often also require a post-encapsulating step with crosslinked polymers, that is, the acid-containing cores are encapsulated with an uncrosslinked shell, the core is swelled, then the shell can be encapsulated with crosslinked polymers.

Applicants have discovered that non-carboxylated latexes having a variety of $T_g$'s will also swell at higher temperatures. The mechanism entails the use of acrylate and methacrylate ester monomers which are hydrolyzable and swellable at higher temperatures in alkaline environments. Such mechanisms for making swollen latexes provide for a wide variety of potential end-uses as well as a wide variety of potential latexes.

SUMMARY OF THE INVENTION

Accordingly, the present invention provides for a method for preparing hollow latexes without the use of acid in the swellable polymer core.

DETAILED DESCRIPTION OF THE INVENTION

The latex can be prepared by stages which create a core and shell structure which subsequent to neutralization forms a hollow particle. Therefore, the latex requires a swellable core and a shell sufficiently deformable to enable the core to swell but sufficiently hard to withstand deformation, thus creating a hollow particle on drying. The latex polymer particles of the present invention can be prepared by using batch or semi-continuous emulsion polymerization.

The degree of swelling by the polymer can be measured by viscometry or HDC (hydrodynamic chromatography).

The nonexistence of acid in the polymer of the present invention advantageously increases its resistance to water sensitivity. The resistance to the effects of water is thought to desirously render the coating into which the latex is formulated less sensitive to moisture as well; a property sought after in coating applications.

The lack of an acidic core reduces the polarity of the polymer; without such polarity the polymer is thought to adsorb surfactants well making them stable and less prone to coagulation or aggregation in larger particles. The lack of water sensitivity of the core is also though to render the core receptive to encapsulation by the shell because the core is not attracted to the polymer-water interface on the surface of the particle and therefore is encapsulated by the shell.

The present process also enables production of hollow polymer particles having crosslinked shells without a post-encapsulating step with crosslinking monomers. Thus the no-acid containing cores can be encapsulated with crosslinked polymers directly and the cores can be hydrolyzed and swelled with bases such as NaOH at elevated temperatures while stretching the crosslinked shells rather than to encapsulate an acid containing core with an uncrosslinked shell, swell the core, then crosslink the shell.

"Hollow polymer latex particles", as used herein, is meant to include latex particles which are not completely solid. Such particle morphology can include various void structures such as uniform microvoids or hemispherical particles with voided centers. The more preferred hollow polymer latex particles are those having a centered void and a particle wall thickness aspect ratio of inner diameter to outer diameter of from about 0.1 to about 0.9. The hollow polymer latex particles having a centered void have greater utility in coatings than those structures having microvoids or hemispherical particles with voided centers.

The more specific hollow latex polymer contemplated by the present invention comprises a hydrolyzable, neutralizable core as a seed, an intermediate copolymer layer with a relatively high $T_g$ that is compatible with the copolymer of the seed, and a rigid copolymer shell which is hydrophobic, crosslinked and is also of a copolymer having a relatively high $T_g$. The latex is then hydrolyzed at a temperature higher than the $T_g$ of the copolymer of the shells.

Latex Monomers

Representative monomers employable to produce hollow latexes of the present invention include acrylate monomer, methacrylate monomer, monovinyl aromatic monomer, aliphatic conjugated diene monomer, a vinylidene halide or vinyl halide monomer, vinyl esters of carboxyl acids containing from 1 to 18 carbon atoms, such as vinyl acetate or vinyl stearate, methacrylonitrile and acrylonitrile. The monoethylenically unsaturated carboxylic acid monomer is used in the shell polymers but is nonexistent in the core polymers. Various mixtures of these monomers are also employable. Crosslinking agents could also be used to decrease the swellability of the polymer or for various other conventionally known reasons for the addition of crosslinking agents to polymers.

By the term "acrylate" monomers is meant those monomers which are used to prepare the swellable copolymers of the present latexes by the processes of the present invention including conventionally known acrylates such as alkyl esters of acrylic acid represented by the formula $CH_2=CHCOOR$, wherein R is from 1 to 16 carbon atoms and substituted alkyls represented by the formulas $-CH_2Cl$; $-CH_2CH_2OH$; and

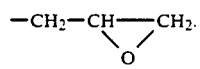

Thus, the term "acrylate" monomer(s) as used herein is meant to include the monovinyl acrylate and methacrylate monomers. The acrylates can include esters, amides and substituted derivatives thereof. Generally, the preferred acrylates are $C_1-C_8$ alkyl acrylates or methacrylates.

Examples of suitable acrylates include methyl acrylate, ethyl acrylate, butyl acrylate, hexyl acrylate, 2-ethyl hexyl acrylate, octyl acrylate and iso-octyl acrylate, n-decyl acrylate, iso-decyl acrylate, tertbutyl acrylate, methyl methacrylate, butyl methacrylate, hexyl methacrylate, isobutyl methacrylate, isopropyl methacrylate as well as 2-hydroxyethyl acrylate and acrylamide. The preferred acrylates are ethyl acrylate, butyl acrylate, 2-ethyl hexyl acrylate, octyl acrylate, iso-octyl acrylate, and methyl methacrylate.

The term "monovinyl aromatic" monomer, as used herein, is meant to include those monomers with a radical of the formula

(wherein R is hydrogen or a lower alkyl such as an alkyl having from 1 to 4 carbon atoms) attached directly to an aromatic nucleus containing from 6 to 10 carbon atoms, including those wherein the aromatic nucleus is substituted with alkyl or halogen substituents. The preferred monovinyl aromatic monomers are styrene and vinyltoluene.

The term "aliphatic conjugated diene" monomer, as used herein, is meant to include compounds such as 1,3-butadiene, 2-methyl-1,3-butadiene, piperylene (1,3-pentadiene), and other hydrocarbon analogs of 1,3-butadiene. Other monomers inclusive as aliphatic conjugated dienes are halogenated compounds such as 2-chloro 1,3 butadiene.

"Vinylidene halides" and "vinyl halides" suitable for this invention include vinylidene chloride and vinyl chloride, which are highly preferred. Vinylidene bromides and vinyl bromide can also be employed.

The term "monoethylenically unsaturated carboxylic acid" monomer, as used herein, is meant to include those monocarboxylic monomers such as acrylic acid, and methacrylic acid; dicarboxylic monomers such as itaconic acid, fumaric acid, maleic acid, and their monoesters.

The $C_3-C_8$ $\alpha,\beta$-ethylenically unsaturated carboxylic acid monomer contemplated include monomers represented by the formula:

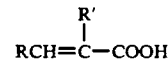

where
R is H and R' is H, $C_1-C_4$ alkyl, or $-CH_2COOX$; R is $-COOX$ and R' is H or $-CH_2COOX$; or R is $CH_3$ and R' is H; and X is H or $C_1-C_4$ alkyl.

Acrylic or methacrylic acid or a mixture thereof with itaconic or fumaric acid are included as well as crotonic and aconitic acid and half esters of these and other polycarboxylic acids such as maleic acid. Although such monomers are contemplated as monomers of the shell stages of the present invention, such acids are not contemplated to be part of the core stage.

The term "crosslinking" monomer is meant to include monomers conventionally known in the art as useful for crosslinking polymerizable monomers. Examples of such monomers typically include di- or tri-functional monomers such as divinyl benzene, ethylene glycol dimethacrylate, 1,3-butylene glycol dimethacrylate, trimethylol propane trimethacrylate, allyl methacrylate or diene functional monomers such as butadiene. The crosslinking monomer can be present in the hollow polymer particles of the present invention in the core or shell stages.

High-temperature water-extended latexes can be made by conventional emulsion polymerization processes including batch or semi-continuous and either seeded or non-seeded emulsion polymerization.

Compositions of Hollow Polymer Particle Phases

A. The Core

The core or seed of the present hollow polymer particles is a copolymer which does not comprise monoethylenically unsaturated carboxylic acid monomer but is swellable at temperatures greater than the $T_g$ of the core copolymer. Monomers most suitable for the core include any base-hydrolyzable acrylic and methacrylic ester monomers. The core copolymer is typically crosslinked and is to be hydrolyzable with alkaline solutions at temperatures greater than the $T_g$ of the copolymer.

The most preferred composition of the core is ethyl acrylate, methyl acrylate and allyl methacrylate. The ratios preferred for the monomers are based on 100 parts by weight of the core total as follows: between about 49 and about 80 parts ethyl acrylate; between about 20 and about 50 parts methyl acrylate; and between about 0.05 and about 1 parts allyl methacrylate. To enable the total number of parts to work out to 100 parts a skilled artisan would understand that if allyl methacrylate is present in an amount of 0.05 parts, the ethyl acrylate will be present in an amount of about 79.95 parts. The most preferred composition for the core is 59.5 parts ethyl acrylate; 40 parts methyl acrylate and 0.5 parts allyl methacrylate: methyl acrylate being the more readily hydrolyzable moiety.

The core should be present in the latex in an amount of from about 2 to about 5 parts by weight based on the total weight of the latex. The most preferred amount of the core to the total latex particle is about 2 parts to about 3.5 parts.

B. The Intermediate Shell Stages

The intermediate shell is an intermediate copolymer layer with a relatively high $T_g$ compared to the core and is made up of monomers that are compatible, with the copolymer of the seed or core. The intermediate shell can comprise the somewhat hydrophilic monomers such as ethyl methacrylate, methyl methacrylate and the hydrophobic harder monomers such as styrene, vinyl toluene, α-methyl styrene, etc.

The preferred composition of the intermediate shell is a copolymer of methyl methacrylate, styrene, methacrylic acid and allyl methacrylate or divinyl benzene. The ratios preferred for the monomers based on 100 parts by weight of the total intermediate shell are as follows: between about 65 and about 99 parts methyl methacrylate; between 0 and about 30 parts styrene; between about 1 and about 3 parts methacrylic acid; and between 0 and about 2 parts allyl methacrylate or divinyl benzene. The most preferred composition for the intermediate shell is 72.5 parts methyl methacrylate; 25 parts styrene; 2 parts methacrylic acid; and 0.5 parts allyl methacrylate or divinyl benzene.

The intermediate shell should be present in the latex in an amount of from about 15 to about 50 parts by weight based on the total weight of the latex. The most preferred amount of the intermediate shell to the total latex particle is about 25 parts.

C. The Outer Shell Stages

The outermost shell is a rigid copolymer which is hydrophobic, crosslinked and is also of a copolymer having a relatively high $T_g$. The composition of the outermost shell will preferably incorporate styrene; methyl methacrylate; methacrylic acid; acrylic acid and allyl methacrylate or divinyl benzene. The ratios preferred for the monomers are based on 100 parts by weight of the total outermost shell as follows: between about 67 and about 99 parts styrene; between 0 and about 25 parts methyl methacrylate; between about 1 and about 3 parts methacrylic acid; between 0 and about 2 parts acrylic acid; and between about 0.5 and about 5 parts allyl methacrylate or divinyl benzene. The crosslinking monomer can be desirably tapered from 0.5 part to 10 parts for balanced expansion and dimensional stability of hollow latexes. The most preferred composition for the outermost shell is 94 parts styrene; 2 parts methacrylic acid; and 2 parts allyl methacrylate or divinyl benzene.

The outermost shell should be present in the latex in an amount of from about 50 to about 85 parts by weight based on the total weight of the latex. The most preferred amount of the intermediate shell to the total latex particle is about 75 parts.

Preparation of the Hollow Latexes

The latexes can be made by means of emulsion polymerization. The core or seed is prepared first and the shells are polymerized subsequently. The expansion of the latexes to produce the hollow morphology can occur as a post-polymerization step.

The temperature during the emulsion polymerization will be anywhere from 50° C. to 150° C.; preferably 70° C. to 100° C. The polymerization time can be from 2 to 10 hours depending upon the pressure and temperature.

The expansion step is achieved by exposing the latex to a strong alkaline solution such as sodium hydroxide, in an amount of from about 0.75 to about 1.5 equivalents based on all the acids in the shell stages and the more easily hydrolyzable acrylate esters in the core such as methyl acrylate. The expansion of the hollow latexes should occur between 100° C. to 150° C.; preferably between 110° C. to 140° C. When the crosslinking of the shells is greater, the temperature of the expansion step should also be greater. Solvents can aid the swelling in the expansion step. The expansion time can range from about 0.5 to about 10 hours; preferably from about 2 to about 5 hours.

Paper Coatings

Paper coating colors as typically known in the art are formulated with clay, pigment (the present hollow polymer latex particles), and styrene/butadiene (S/B) latex binder. To avoid coating placement problems associated with paper substrates, the coatings are made on polyester films by using a Meyer Rod to obtain a desired thickness of the coatings. They are calendered typically at 150° F., 1000 pli, and 3 nips, then are measured for gloss and opacity.

EXAMPLE

A hydrolyzable, expandable core latex is prepared by charging into a two-gallon reactor approximately: 2158 grams (g) of water; 0.6 g of sodium persulfate; 2 g of a 45 percent solution of an alkylated diphenol oxide disulfonate surfactant; and 43 g of a 1 percent active aqueous pentasodium diethylene triamine pentaacetate solution. The monomer feed comprising 1267 g (59.5 parts) of ethyl acrylate, 852 g (40 parts) of methyl acrylate and 11 g (0.5 part) or allyl methacrylate is then simultaneously con-added over 4 hours to the reactor with an aqueous feed comprising: 47.3 g of a 45 percent solution of an alkylated diphenol oxide disulfonate surfactant; 6.4 g of sodium persulfate; 213 g of GAFAC® RE-610 (10 percent) (GAF Corporation's phosphate ester of nonionic surfactant) and 852 g of water. Upon completion of the con-add, the core latex is allowed to polymerize to completion, the latex is then cooled. The latex is found to be 1250 Å in diameter, 39.53 percent solids, and pH 2.49.

The shells are prepared by charging to a reactor: 2.5 parts based on solids of the seed or core prepared above; approximately 2099 grams (g) of water; 0.6 g of sodium persulfate; 135 g of the core latex prepared above (2.5 parts) (39.53 percent) and 41 g of a 1 percent active aqueous pentasodium diethylene triamine pentaacetate solution.

The monomer feeds comprising 376 g (18.1 parts) of methyl methacrylate, 130 g (6.3 parts) of styrene, 10 g (0.5 parts) of methacrylic acid and 3 g (0.1 part) of allyl methacrylate is then con-added over 75 minutes to the reactor simultaneously with an aqueous feed comprising 46 g of a 45 percent solution of an alkylated diphenol oxide disulfonate surfactant; 10 g of sodium persulfate; 207 g of GAFAC® RE-610 (10 percent); 10 g of a 20 percent solution of sodium hydroxide and 829 g of water (the aqueous stream is a continuous stream for both the first and second monomer streams); upon completion of the first monomer stream, a second monomer stream is con-added over 225 minutes with the aqueous feed; the second monomer stream comprising 1515 g (73.1 parts) of styrene, 31 g (1.5 parts) of methacrylic acid and 8 g (0.4 parts) of allyl methacrylate. Upon completion of the con-add, the solution is allowed to polymerize to completion and the latex is cooled. The latex is determined to be 4192 Å in diameter, 39.66 percent solids, and pH 3.17.

The evaluation of the swelling of the particle is done by determining the swell ratio (SR) of the latex. The swelling ratios are measured by Hydrodynamic Chromatography. The swelling ratio can also be measured by viscosity measurements.

The particle size distribution of the latex by HDC prior to hydrolysis/swelling is measured and the latex is then exposed to one equivalent of sodium hydroxide per each acid and methyl acrylate in the particle at 120° C. for three hours. The percent volume increase of the latex is about 23 percent indicating a swelling of the latex will enable the latex to occupy a greater volume than the unswelled latex. The core measurement indicates a swelling of approximately thirteen times its original size. The average particle size increases from about 4190 Angstroms to about 4580 Angstroms.

The opacifying power of the unexpanded latex prepared above and the same latex expanded which is a hollow polymer latex particle, is tested as follows:

The base (unexpanded) latex and the expanded latex (hollow polymer latex particle) are blended with a styrene/butadiene (S/B) latex binder at a weight ratio of 30/70, respectively, and these blends are formulated at about 45 percent solids. Coatings are made on 2-mil polyester films with No. 30 Meyer Rod (a wire-wound rod) and their thickness is about 1 mil. Before the drawdown, the polyester film surface is cleaned with a soap solution. The opacity of these air-dried latex blend coatings is measured on BNL-2 Opacimeter in terms of a contrast ratio (TAPPI Testing Procedures T-425). The opacity of the base latex-containing coating is found to be 20.4, while the expanded latex-containing coating is 50.1. These results clearly demonstrate that the expanded latex particles are acting as opacifying hollow polymer latex particles.

Arternatively, the above unexpanded base latex is mixed with varying amounts (50–100 parts per 100 parts of the base latex) of styrene and divinyl benzene mixtures (S/DVB: 95/5–85/15) and an oil-soluble initiator such as tertiary perbenzoate at a level of 0.5 part per 100 parts monomer mixture and is subject to the simultaneous expansion and polymerization at 120° C. for 5 hours. These hollow polymer latex particles made by this process exhibit good opacity.

In another case, the above unexpanded base latex is first expanded, then encapsulated with different amounts of styrene and divinyl benzene mixtures at 90° C. These hollow polymer latex particles made by this post-encapsulation also exhibit good opacifying properties.

A hollow polymer latex particle prepared as above is evaluated for paper coating properties such as gloss and opacity, then is compared with a comparative polystyrene plastic pigment of the same particle size as that of the hollow polymer latex particle. Paper-coating colors are formulated as follows: 90 parts No. 1 clay, 10 parts plastic pigment, and 15 parts styrene/butadiene (S/B) latex binder at 60 percent solids and pH 7-8. These two coatings containing the above hollow polymer latex particle and comparative polystyrene plastic pigment, respectively, are made on 2 mil polyester films cleaned with a soap solution by using No. 20 Meyer Rod to obtain about 1 mil thick coatings. They are calendered at 150° F., 1000 pli, and 3 nips, then are measured for gloss and opacity. The results are shown in Table I.

TABLE I

| Coating Composition | TAPPI 75° Gloss | TAPPI Opacity |
|---|---|---|
| Polystyrene PP (comparative example - not an example of the invention) | 84.5 | 71.8 |
| Example - hollow latex particle | 87.5 | 73.4 |

TAPPI 75° Gloss by TAPPI Testing Procedures T-480
TAPPI Opacity by TAPPI Testing Procedures T-425

The above results clearly show that the hollow polymer latex particle improves both paper coating gloss and opacity.

What is claimed is:
1. A process for preparing hollow latex copolymers comprising:
   A) emulsion polymerizing a copolymer latex having
      i) a core phase comprising: ethyl acrylate, methyl acrylate and allyl methacrylate;
      ii) an intermediate shell comprising methyl methacrylate, styrene, methacrylic acid and allyl methacrylate or divinyl benzene; and
      iii) an outermost shell phase comprising a hydrophobic, crosslinked copolymer having a relatively high $T_g$ wherein the monomers are selected from the group consisting of: styrene; methyl methacrylate; methacrylic acid; acrylic acid and allyl methacrylate or divinyl benzene;
   B) exposing the copolymer latex, at a temperature of from about 100° C. to about 150° C., to a strong alkaline solution, in an amount of from about 0.75 to about 1.5 equivalents based on all the acids in the shell stages and the hydrolyzable acrylate esters in the core.
2. The process of claim 1 wherein
   i) the core phase comprises between about 49 and about 80 parts ethyl acrylate; between about 20 and about 50 parts methyl acrylate; and between about 0.05 and about 1 parts allyl methacrylate wherein the ratios for the monomers are based on 100 parts by weight of the total core;
   ii) the intermediate shell comprises, based on 100 parts by weight of the total intermediate shell, between 65 and about 99 parts methyl methacrylate; between about 0 and about 30 parts styrene; between about 1 and about 3 parts methacrylic acid; and between 0 and about 2 parts allyl methacrylate or divinyl benzene; and
   iii) the outermost shell comprises, based on 100 parts by weight of the total shell between about 67 and about 99 parts styrene; between 0 and about 25 parts methyl methacrylate; between about 1 and about 3 parts methacrylic acid; between 0 and about 2 parts acrylic acid; and between about 0.5 and about 5 parts allyl methacrylate or divinyl benzene.

3. The process of claim 1 wherein
i) the core phase comprises 59.5 parts ethyl acrylate; 40 parts methyl acrylate and 0.5 parts allyl methacrylate wherein the ratios for the monomers are based on 100 parts by weight of the total core;
ii) the intermediate shell comprises, based on 100 parts by weight of the total intermediate shell, 72.5 parts methyl methacrylate; 25 parts styrene; 2 parts methacrylic acid; and 0.5 parts allyl methacrylate or divinyl benzene; and
iii) the outermost shell phase comprises, based on 100 parts by weight of the shell total, 94 parts styrene; 2 parts methacrylic acid; and 2 parts allyl methacrylate or divinyl benzene.

4. The process of claim 2 wherein
i) the core phase is present in the latex in an amount of from about 2 to about 5 parts by weight based on the total weight of the latex;
ii) the intermediate shell is present in the latex in an amount of from about 15 to about 50 parts by weight based on the total weight of the latex; and
iii) the outermost shell phase is present in the latex in an amount of from about 50 to about 85 parts by weight based on the total weight of the latex.

5. The process of claim 4 wherein the amount of core to total latex particle is from about 2 to about 3.5 parts; the amount of intermediate shell to total latex particle is about 25 parts; and the amount of the outermost shell to total latex particle is about 75 parts.

6. The process of claim 5 wherein the temperature during the emulsion polymerization will be from about 50° C. to about 150° C.; the polymerization time is from about 2 to about 10 hours; the expansion step is between about 100° C. to about 150° C.; and the expansion time is from about 0.5 to about 10 hours.

7. A coating composition comprising:
A) a latex having:
    i) a core phase comprising between about 49 and about 80 parts ethyl acrylate; between about 20 and about 50 parts methyl acrylate; and between about 0.05 and about 1 parts allyl methacrylate wherein the ratios for the monomers are based on 100 parts by weight of the total core;
    ii) an intermediate shell comprising, based on 100 parts by weight of the intermediate shell total, between about 65 and about 99 parts methyl methacrylate; between 0 and about 30 parts styrene; between about 1 and about 3 parts methacrylic acid; and between 0 and about 2 parts allyl methacrylate or divinyl benzene; and
    iii) an outermost shell comprising, based on 100 parts by weight of the shell total between about 67 and about 99 parts styrene; between 0 and about 25 parts methyl methacrylate; between about 1 and about 3 parts methacrylic acid; between 0 and about 2 parts acrylic acid; and between about 0.5 and about 5 parts allyl methacrylate or divinyl benzene;
the latex having been exposed to a strong alkaline solution in an amount of from about 0.75 to about 1.5 equivalents based on all the acids in the shell stages and the methyl acrylate in the core.

* * * * *